United States Patent [19]

Kuwata et al.

[11] Patent Number: 5,256,720
[45] Date of Patent: Oct. 26, 1993

[54] POLYPROPYLENE RESIN COMPOSITION

[75] Inventors: Satoshi Kuwata; Toshio Shiobara, both of Gunma, Japan

[73] Assignee: Shin-Etsu Chemical Co., Ltd., Tokyo, Japan

[21] Appl. No.: 888,712

[22] Filed: May 27, 1992

[30] Foreign Application Priority Data

May 27, 1991 [JP] Japan .................. 3-151030

[51] Int. Cl.$^5$ .......................... C08K 3/36; C08K 9/06
[52] U.S. Cl. .................................. 524/492; 524/493; 524/847; 524/188; 524/262; 524/264; 524/265; 523/212; 523/213
[58] Field of Search .............. 524/430, 431, 432, 433, 524/408, 492, 493, 847; 501/87; 523/212, 213, 214, 204, 205, 210, 209; 423/212; 428/626

[56] References Cited

U.S. PATENT DOCUMENTS

| | | | |
|---|---|---|---|
| 3,331,806 | 7/1967 | Fior et al. | 524/430 |
| 3,546,150 | 12/1970 | White et al. | 523/210 |
| 4,151,154 | 4/1979 | Berger | 523/213 |
| 4,237,190 | 12/1980 | McGee et al. | 523/205 |
| 4,409,342 | 10/1983 | Ancker et al. | 523/213 |
| 4,622,352 | 11/1986 | Djiauw | 523/212 |
| 4,705,762 | 11/1987 | Ota et al. | 501/87 |
| 4,711,916 | 12/1987 | Hagiwara et al. | 524/430 |
| 5,102,746 | 4/1992 | Shindou et al. | 428/626 |
| 5,124,384 | 6/1992 | Goldstein | 524/492 |

FOREIGN PATENT DOCUMENTS 60-255602 12/1985 Japan .

*Primary Examiner*—Veronica P. Hoke
*Assistant Examiner*—Peter Szekely
*Attorney, Agent, or Firm*—Millen, White, Zelano & Branigan

[57] ABSTRACT

Disclosed is a novel polypropylene resin composition which is outstandingly free from surface tackiness and still has good transparency so as to be useful as a material of resin films used for wrapping. The resin composition comprises, as a uniform blend, (a) 100 parts by weight of a polypropylene resin, and (b) from 0.01 to 10 parts by weight of an inorganic oxide powder which is a product obtained by the deflagration of an inorganic oxidizable powder, e.g., an elementary silicon powder, in an oxidizing atmosphere such as air. By virtue of the unique method for the preparation of the silicon dioxide powder, the particles have high surface activity so that the surface properties of the resin composition or, in particular, resin films prepared therefrom can be greatly improved even with a relatively small amount of the inorganic oxide powder compounded as an anti-blocking agent not to badly affect the transparency.

11 Claims, No Drawings

POLYPROPYLENE RESIN COMPOSITION

BACKGROUND OF THE INVENTION

The present invention relates to a novel polypropylene resin composition or, more particularly, to a polypropylene resin composition-capable of giving a polypropylene resin film having excellent resistance against blocking or slipperiness of the surface so as to be smoothly wound up in a roll in the film-shaping works and to be suitable as a wrapping material with respect to the ease of opening the mouth of a film bag prepared therefrom.

One of the important applications of a polypropylene resin is as a material of resin films for wrapping use. Polypropylene resins in general, however, have a serious drawback as a material of resin films because polypropylene resins usually have tackiness on the surface so that the winding velocity of the resin film as shaped into a roll is greatly limited thereby to cause blocking resulting in a decrease in the productivity of the resin films. This is because the velocity of rewinding of a rolled film cannot be high enough, for example, in the bag-making works and thereby greatly decrease the working efficiency. Furthermore, film bags prepared from a polypropylene resin film are not always quite convenient in use because the resin films at the folded bag mouth sometimes firmly adhere to each other causing difficulty when the bag mouth is hastily opened by pulling the resin films apart.

Several attempts and proposals of course have been made heretofore in order to solve the above mentioned problem due to the surface tackiness of polypropylene resin films, mainly, by incorporating various kinds of anti-blocking agents into a polypropylene resin to give a resin composition. The anti-blocking agents heretofore proposed include, for example, anhydrous active silicic acid disclosed in Japanese Patent Publication No. 39-16908, kaolinite disclosed in Japanese Patent Kokai No. 43-24523, finely pulverized zeolite disclosed in Japanese Patent Publication No. 52-16134 and other inorganic powdery materials. These anti-blocking agents are of course not ineffective but effective at least to some extent in exhibiting an anti-blocking effect when the resin composition is shaped into a resin film. When a high anti-blocking effect is desired with these anti-blocking agents, however, the compounding amount of the anti-blocking agent must be so large that the polypropylene resin film shaped from the resin composition has a greatly decreased transparency so that the resin film can be used in a limited field of applications. In this regard, proposals have been made that the decrease in the transparency of the resin films can be mitigated when the resin film is shaped from a polypropylene resin composition compounded with silicon dioxide and a magnesium salt or aluminum salt of a higher fatty acid in combination as disclosed in Japanese Patent Kokai No. 58-225142 or with an inorganic powder of which the particles have a lamellar structure disclosed in Japanese Patent Kokai No. 57-18747 although these methods do not provide a full solution of the problem.

Furthermore, a silicone resin powder is proposed as an antiblocking agent in a crystalline polypropylene resin film (see Japanese Patent Kokai No. 62-215646) or a resin film of a propylene-α-olefin copolymer (see Japanese Patent Kokai No. 62-232448 and No. 62-233248). This method is, indeed, effective to some extent in solving the above described problems but the effectiveness cannot be high enough unless the amount of the silicone resin powder compounded in the resin composition is so large as to cause an economical disadvantage due to the great increase in the cost of the resin composition.

SUMMARY OF THE INVENTION

The present invention accordingly has as an object to provide a novel polypropylene resin composition capable of giving a resin film having excellent transparency and slipperness of the surface to be resistant against blocking when the resin films are stacked one on the other so that the film bags prepared from the resin film are convenient in use because the mouth of the folded bag can be easily opened without sticking of the films.

Thus, the polypropylene resin composition of the present invention comprises, as a blend:

(a) 100 parts by weight of a homopolymeric polypropylene resin or a copolymeric resin mainly consisting of a propylene moiety; and (b) from 0.01 to 10 parts by weight of an inorganic oxide powder which is a product by the deflagration of an inorganic oxidizable powder in an oxidizing atmosphere.

DETAILED DESCRIPTION OF THE PREFERRED EMBODIMENTS

The principal constituent of the inventive resin composition is a polypropylene or a copolymeric resin mainly consisting of the moiety of propylene. The comonomer copolymerizable with propylene in a minor amount is exemplified by α-olefins other than propylene such as ethylene, butene-1, pentene-1, 4-methylpentene-1, hexene-1, octene-1 and the like, acrylic acid, maleic anhydride and derivatives thereof, aromatic vinyl monomers, e.g., styrene, and the like. The copolymer can be either one of random, block and graft copolymers. Homopolymeric polypropylene resins are preferred as the component (a). The polypropylene resin should preferably have a melt flow rate in the range from 2 to 10 g/10 minutes.

The inorganic oxide powder as the component (b) is a product obtained by the deflagration of an inorganic oxidizable powder in an oxidizing atmosphere according to the procedure described, for example, in Japanese Patent Kokai No. 60-255602. Namely, a fine powder of an inorganic oxidizable material such as a metal powder is suspended in a high concentration in an atmosphere of an oxidizing gas such as air or oxygen-enriched air in a reaction chamber to form a dust nebula to which fire is set by using a suitable fire source such as an electric arc, plasma, chemically a burning flame and the like so that deflagrating combustion of the metal particles takes place to produce fine inorganic oxide particles in the nebula. The particle diameter of the inorganic oxidizable material should preferably be as fine as possible and not exceed 0.4 mm. The inorganic oxidizable material suitable for the purpose includes various kinds of metals such as aluminum, manganese, niobium, zirconium, titanium, magnesium, iron and the like but it is preferably silicon so that the fine inorganic oxide powder is a silicon dioxide powder.

A typical method for forming a dust nebula of the inorganic oxidizable powder is that the powder is introduced into a reaction chamber as carried by the oxidizing gas blown into the chamber to form the atmosphere of the deflagration reaction. The concentration of the inorganic oxidizable powder in the dust nebula should be at least 20 g/m$^3$ or, preferably, at least 500 g/m$^3$ or, more preferably, at least 1000 g/m$^3$ since propagation of the deflagration reaction is more stable and smooth when the concentration of the dust nebula is high.

When such a dust nebula of, for example, a metal powder is ignited, thermal energy is given to the surface of the metal particles to increase the temperature of the particle surface so that the vapor of the metal diffuses around from the surface of the particles. This vapor is mixed with the oxidizing gas of the atmosphere so that combustion of the mixed vapor propagates in a chain reaction by which the metal particles per se may eventually be comminuted and scattered around to further promote propagation of the deflagration reaction. After combustion, the inorganic oxide in the gaseous form is spontaneously cooled to cause growth of the oxide particles. The thus formed inorganic oxide particles may be in a polyhedral but predominantly in a spherical form of the particle configuration usually having a diameter in the range from 0.01 to 20 μm. It is preferable in the invention that the oxide particles have a spherical particle configuration with respect to the good impregnability of the polypropylene resin as the matrix.

As a consequence of the spontaneous cooling to cause growth of the particles, the inorganic oxide powder prepared by the above described process is highly active on the surface of the particles as compared with conventional spherical oxide particles formed from a melt at high temperatures. For example, a large amount of active silanol groups are found on the surface of the silicon dioxide particles prepared by the deflagration method.

It is further preferable that the inorganic oxide particles prepared by the deflagration method are subjected to a surface treatment with an organic silicon compound in order to improve the dispersibility of the powder in a polypropylene resin. The method for the surface treatment of a powder with an organic silicon compound is well known in the art and not particularly limitative, for example, by spraying the organic silicon compound to the powder followed by a heat treatment of the powder wet with the organic silicon compound. It is a convenient way of surface treatment that the organic silicon compound is sprayed into the reaction chamber in which the deflagration reaction of the inorganic oxidizable powder has been undertaken. This method is preferred with respect to the higher surface activity of the oxide particles than those obtained otherwise.

Various kinds of organic silicon compounds can be used for the purpose described above including, for example, methyl trimethoxy silane, dimethyl dimethoxy silane, n-octyl trimethoxy silane, 3-aminopropyl trimethoxy silane, 3-mercaptopropyl trimethoxy silane, hexamethyl disilazane, 3-methacryloxypropyl trimethoxy silane, phenyl trimethoxy silane, phenyl methyl diethoxy silane, 3-glycidyloxypropyl trimethoxy silane, 3-glycidyloxypropyl methyl dimethoxy silane, 10-trimethoxysilyl-1,2-epoxy decane and the like though not particularly limitative thereto. These organosilicon compounds can be used either singly or as a combination of two kinds or more according to need. Further, a partial hydrolysis product of these hydrolyzable silane compounds can also be used for the same purpose.

The amount of the organic silicon compound used for the surface treatment of the inorganic oxide powder is usually in the range from 0.05 to 5% by weight or, preferably, in the range from 0.1 to 1% by weight based on the amount of the inorganic oxide powder, though dependent on the balance of the specific surface area of the inorganic oxide particles and the area occupied by a single molecule of the organic silicon compound. The organic silicon compound can be sprayed as such but it is optional that a mixture of the organic silicon compound with water, desirably, containing a strong basic compound such as DBU, i.e. 1,8-diazabicyclo(5,4,0)undecene-7, is sprayed.

The amount of the inorganic oxide powder compounded with the polypropylene resin is in the range from 0.01 to 10 parts by weight per 100 parts by weight of the resin. Preferably, the amount is in the range from 0.05 to 5 parts by weight or, more preferably, in the range from 0.1 to 1 part by weight per 100 parts by weight of the resin. When the amount of the powder is too small, the desired anti-blocking effect cannot be fully exhibited as a matter of course. When the amount is too large, on the other hand, a disadvantage is caused that the resin film shaped from the resin composition would be poorly transparent.

When the polypropylene resin composition of the invention is used as a material of resin films, it is optional that the composition is further compounded with various kinds of known additives including stabilizers, i.e. antioxidants and ultraviolet absorbers, processing aids, coloring agents, antistatic agents, lubricants and the like each according to need in a limited amount.

The method for blending the above described components (a) and (b) and other optional additives is not particularly limitative but can be conventional by using a suitable blending machine such as Henschel mixers, V-blenders, ribbon blenders, kneaders and the like to give a desired polypropylene resin composition which can be shaped into a resin film by a known molding method such as the T-die method, circular-die method, inflation method and the like.

In the following, examples and comparative examples are given to illustrate the polypropylene resin composition of the invention in more detail although the scope of the invention is never limited thereto. The silicon dioxide powders used in the experiments were obtained each in the following manner.

SILICON DIOXIDE POWDER NO. 1

Spherical particles of silicon dioxide having an average particle diameter of about 2 μm were prepared from an elementary silicon powder of 98% purity having a particle diameter not exceeding 150 μm by the deflagration method according to the disclosure in Japanese Patent Kokai No. 60-255602 in a reaction chamber into which a 1:3:0.025 by weight mixture of methyl trimethoxy silane, dimethyl dimethoxy silane and DBU was sprayed in an amount of 0.7% by weight based on the amount of the silicon dioxide powder immediately after the deflagration reaction. The powder had a particle size distribution in the range from 0.1 to 5 μm.

SILICON DIOXIDE POWDER NO. 2

The silicon dioxide powder prepared in the same manner as in the preparation of the powder No. 1 described above by the deflagration method was put into a vessel together with 1% by weight of hexamethyl disilazane and agitated in the closed vessel for 24 hours followed by a heat treatment at 150° C. for 4 hours.

SILICON DIOXIDE POWDER NO. 3

The preparation procedure was the same as in the preparation of the powder No. 1 described above excepting replacement of the methyl trimethoxy silane with the same amount of n-octyl trimethoxy silane.

SILICON DIOXIDE POWDER NO. 4

The preparation procedure was the same as in the preparation of the powders No. 1 to No. 3 described above excepting omission of the surface treatment of the silicon dioxide powder obtained by the deflagration method.

SILICON DIOXIDE POWDER NO. 5

A commercial product of a fused silica powder having an average particle diameter of 15 μm (RD-8, a product by Tatsumori Co.) was used as purchased.

The resin films prepared in Examples and Comparative Examples were evaluated for the items given below by the testing procedures described there.

TRANSPARENCY OF FILMS

Ten sheets of the film were stacked one on the other and the transmission of light therethrough was determined according to the procedure specified in JIS K 7105 using a tungsten lamp as the light source.

BLOCKING OF FILMS

Two sheets of the film were sandwiched between two glass plate and kept standing as such at room temperature for 24 hours under a load of 100 g/cm$^2$ followed by cutting to give a test specimen of 5 cm wide, of which the resistance in g required for peeling apart the two sheets was determined as a measure of the film blocking.

SLIPPERINESS

The kinematic friction coefficient was determined between the resin film and a sheet of a SBR rubber as a measure of the surface slipperiness.

MOUTH-OPENING ADAPTABILITY OF FILM BAGS

Two sheets of the film were sandwiched between two glass plate in the same manner as in the blocking test but under a load of 20 g/cm$^2$ for 24 hours at room temperature and the sheets thus adhering to each other were subjected to a test of sliding one on the other by rubbing between two finger tips to record easiness of sliding according to the three ratings below.

A: easily slidable
B: slidable with some resistance
C: slidable with considerably strong resistance

EXAMPLES 1 TO 8 AND COMPARATIVE EXAMPLES 1 AND 2.

A polypropylene resin composition was prepared in each of the experiments by uniformly blending 100 parts by weight of a polypropylene resin for T-die extrusion having a melt flow rate of 8 g/10 minutes (Noblene FL-200, a product by Mitsui-Toatsu Chemical Co.) with either one of the silicon dioxide powders No. 1 to No. 5 described above in an amount in parts by weight indicated in Table 1 below. The resin composition was extruded at 250° C. using a single-screw extruder machine of 25 mm diameter and pelletized in a pelletizer. The pellets were shaped into a film of 0.5 mm thickness at 250° C. by the T-die extrusion method using a single-screw extruder machine of 20 mm diameter. The results of the evaluation tests of the thus prepared resin films are shown in Table 1.

COMPARATIVE EXAMPLE 3.

The experimental procedure was substantially the same as above excepting replacement of the silicon dioxide powder with 0.3 part by weight of a fine powder of poly(methyl silsesquioxane) consisting of spherical particles having an average particle diameter of 2 μm and a particle size distribution ranging from 0.1 to 5 μm. The results obtained in the evaluation tests of the thus prepared resin film are shown also in Table 1.

COMPARATIVE EXAMPLE 4.

The experimental procedure was substantially the same as in Examples 1 to 8 and Comparative Examples 1 to 3 excepting entire omission of the sinorganic oxide powder. The results obtained in the evaluation tests of the resin film thus obtained are shown also in Table 1.

TABLE 1

| Example No. | Silicon dioxide No. | Amount added, parts by weight | Properties of film | | | |
|---|---|---|---|---|---|---|
| | | | Transparency, % | Blocking strength, g/5 cm | Slipperiness | Mouth opening of film bag |
| Example 1 | 1 | 0.3 | 85 | 2.5 | 0.25 | A |
| Example 2 | 1 | 0.6 | 78 | 1.8 | 0.22 | A |
| Example 3 | 1 | 1.0 | 75 | 1.5 | 0.16 | A |
| Example 4 | 1 | 0.1 | 89 | 2.9 | 0.30 | A |
| Example 5 | 2 | 0.3 | 82 | 2.8 | 0.28 | A |
| Example 6 | 2 | 0.6 | 75 | 2.1 | 0.24 | A |
| Example 7 | 3 | 0.3 | 84 | 2.4 | 0.23 | A |
| Example 8 | 4 | 0.6 | 72 | 2.0 | 0.26 | A |
| Comparative Example 1 | 1 | 0.009 | 91 | 7.9 | 0.40 | C |
| Comparative Example 2 | 5 | 0.6 | 58 | 2.5 | 0.24 | A |
| Comparative Example 3 | — | 0 | 61 | 2.8 | 0.28 | A |
| Comparative | — | 0 | 92 | 8.2 | 0.41 | C |

TABLE 1-continued

| Example No. | Silicon dioxide | | Properties of film | | | |
|---|---|---|---|---|---|---|
| | No. | Amount added, parts by weight | Transparency, % | Blocking strength, g/5 cm | Slipperiness | Mouth opening of film bag |
| Example 4 | | | | | | |

What is claimed is:

1. A polypropylene resin composition which is a uniform blend comprising:
   (a) 100 parts by weight of a homopolymeric polypropylene resin or a copolymeric resin consisting essentially of propylene moieties; and
   (b) from 0.01 to 10 parts by weight of an inorganic oxide powder which is produced by the deflagration, of an inorganic oxidizable powder comprising silicon, in an oxidizing atmosphere.

2. The polypropylene resin composition as claimed in claim 1 in which the component (a) is a homopolymeric polypropylene resin.

3. The polypropylene resin composition as claimed in claim 2 in which the homopolymeric polypropylene resin has a melt flow rate in the range from 2 to 10 g/10 minutes.

4. The polypropylene resin composition as claimed in claim 1 in which the inorganic oxidizable powder has an average particle diameter not exceeding 0.4 mm.

5. The polypropylene resin composition as claimed in claim 1 in which the concentration of the inorganic oxidizable powder in the oxidizing atmosphere is at least 20 g/m$^3$.

6. The polypropylene resin composition as claimed in claim 1 in which the inorganic oxide powder has an average particle diameter in the range from 0.01 to 20 μm.

7. The polypropylene resin composition as claimed in claim 1 in which the inorganic oxide powder is treated on the surface of the particles with an organic silicon compound.

8. The polypropylene resin composition as claimed in claim 7 in which the amount of the organic silicon compound is in the range from 0.05 to 5% by weight based on the amount of the inorganic oxide powder.

9. The polypropylene resin composition as claimed in claim 7 in which the organic silicon compound is selected from the group consisting of methyl trimethoxy silane, dimethyl dimethoxy silane, n-octyl trimethoxy silane, 3-aminopropyl trimethoxy silane, 3-mercaptopropyl trimethoxy silane, hexamethyl disilazane, 3-methacryloxypropyl trimethoxy silane, phenyl trimethoxy silane, phenyl methyl diethoxy silane, 3-glycidyloxypropyl trimethoxy silane, 3-glycidyloxypropyl methyl dimethoxy silane, 10-trimethoxysilyl-1,2-epoxy decane and partial hydrolysis products thereof.

10. The polypropylene resin composition as claimed in claim 1 in which the amount of the inorganic oxide powder as the component (b) is in the range from 0.5 to 5 parts by weight per 100 parts by weight of the resin as the component (a).

11. A resin film shaped from a polypropylene resin composition comprising as a uniform blend:
   (a) 100 parts by weight of a homopolymeric polypropylene resin or a copolymeric resin mainly consisting of the propylene moiety; and
   (b) from 0.01 to 10 parts by weight of an inorganic oxide powder which is a product by the deflagration of an inorganic oxidizable powder of silicon in an oxidizing atmosphere.

* * * * *